United States Patent [19]
Zellweger

[11] Patent Number: 6,144,968
[45] Date of Patent: Nov. 7, 2000

[54] METHOD AND APPARATUS FOR MENU ACCESS TO INFORMATION OBJECTS INDEXED BY HIERARCHICALLY-CODED KEYWORDS

[76] Inventor: Paul Zellweger, 12 Holworthy Pl., Cambridge, Mass. 02138

[21] Appl. No.: 09/033,777

[22] Filed: Feb. 3, 1998

Related U.S. Application Data

[60] Provisional application No. 60/039,879, Mar. 4, 1997.

[51] Int. Cl.[7] ........................................... G06F 17/30
[52] U.S. Cl. ............................. 707/104; 707/103
[58] Field of Search ................... 707/2, 3, 4, 5, 707/501, 101, 104, 100, 103; 395/767, 161

[56] References Cited

U.S. PATENT DOCUMENTS

| | | | |
|---|---|---|---|
| 4,817,036 | 3/1989 | Millett et al. | 364/900 |
| 5,109,509 | 4/1992 | Katayama et al. | 707/104 |
| 5,167,011 | 11/1992 | Prist | 707/3 |
| 5,375,235 | 12/1994 | Berry et al. | 395/600 |
| 5,404,514 | 4/1995 | Kageneck et al. | 707/3 |
| 5,440,481 | 8/1995 | Kostoff et al. | 364/419.08 |
| 5,542,024 | 7/1996 | Balint et al. | 395/161 |
| 5,598,557 | 1/1997 | Doner et al. | 707/5 |
| 5,619,708 | 4/1997 | Ho | 395/767 |
| 5,630,117 | 5/1997 | Oren et al. | 395/602 |
| 5,630,125 | 5/1997 | Zellweger | 395/600 |
| 5,721,897 | 2/1998 | Rubinstein | 707/2 |
| 5,787,416 | 7/1998 | Tabb et al. | 707/2 |
| 5,794,233 | 8/1998 | Rubinstein | 707/4 |
| 5,819,261 | 10/1998 | Takahashi et al. | 707/3 |
| 5,829,002 | 10/1998 | Priest | 707/10 |
| 5,842,203 | 11/1998 | D'Elena et al. | 707/4 |
| 5,873,107 | 2/1999 | Borovoy et al. | 707/501 |
| 5,911,138 | 6/1999 | Li et al. | 707/3 |

OTHER PUBLICATIONS

U.S provisional No. 60/039,878, Zellweger, filed Mar. 4, 1997.

U.S. provisional No. 60/039,877, Zellweger, filed Mar. 4, 1997.

*Primary Examiner*—Thomas G. Black
*Assistant Examiner*—Frantz Coby

[57] ABSTRACT

The present invention discloses how to implement a menu-based retrieval system for an information management system that uses a controlled vocabulary based on hierarchically oriented keywords. In this context each keyword has a hierarchically ordered code and one or more keywords are assigned to an information object. The menu system disclosed in the present invention enables end-users to employ a point-and-click method to generate a query language command that retrieves information objects. The developer menu system was also disclosed that enables information technologists to use a point-and-click method to assign keywords to an information object.

17 Claims, 13 Drawing Sheets

Fig. 1

| KID | KEYWORD_DESCRIPTION | LEAF |
|---|---|---|
| U | PRODUCTS BY GM DIVISIONS | 0 |
| U1 | PONTIAC | 0 |
| U10 | FIREBIRD SERIES | 0 |
| U100 | FIREBIRD I | 1 |
| U101 | FIREBIRD II | 1 |
| U102 | FIREBIRD III | 1 |
| U11 | STREAMLINER SERIES | 0 |
| U110 | CONVERTIBLE | 1 |
| U12 | STAR CHIEF SERIES | 0 |
| U120 | CONVERTIBLE | 1 |
| U13 | CATALINA | 1 |
| U14 | BONNEVILLE SERIES | 1 |
| U15 | GRAND PRIX SERIES | 1 |
| U16 | PARISIENNE SERIES | 1 |
| U17 | LE MANNS SERIES | 1 |
| U18 | CHIEFTAIN SERIES | 1 |
| U2 | CADILLAC | 0 |
| U21 | ELDORADO | 0 |
| U210 | BROUGHAM | 1 |

Figure 2a

| PID | FILM | PHOTOGRAPHER | FORMAT | YEAR | FILE |
|---|---|---|---|---|---|
| 100623 | C | Thomas Hess | Vertical | 1963 | AAMDH.BMP |
| 100881 | C | Vera Wolfe | Vertical | 1965 | AAMGA.BMP |
| 42190 | C | Deryn Moran | Horizontal | 1992 | TCE.BMP |
| 18000 | B | Andrew Harvey | Vertical | 1931 | JDW.BMP |

Figure 2b

| PID | KID | NEXT |
|---|---|---|
| 100623 | U101 | 0 |
| 100623 | X15 | 0 |
| 100623 | Y603 | 1 |
| 100623 | W4121 | 0 |
| 100881 | U13 | 0 |
| 100881 | Y605 | 1 |
| 100881 | W4121 | 0 |

METHOD AND APPARATUS FOR MENU ACCESS TO INFORMATION OBJECTS INDEXED BY HIERARCHICALLY-CODED KEYWORDS

CROSS REFERENCES TO RELATED APPLICATION

This application is based on Provisional Application No. 60/039,879 entitled Method and Apparatus for Menu Access to Information Objects Indexed by Hierarchical Keywords, filed Mar. 4, 1997.

FIELD OF INVENTION

The present invention relates to information management systems, in general, and, in particular, to a menu system for an information management system that employs hierarchically-coded keywords to store and retrieve information objects.

| REFERENCES | | | |
|---|---|---|---|
| 09/033,774 | 3/3/98 | Zellweger | |
| 09/033,775 | 3/3/98 | Zellweger | |
| 5,911,138 | 6/8/1999 | Li et al. | 707/3 |
| 5,873,107 | 2/16/1999 | Borovoy et al. | 707/501 |
| 5,842,203 | 11/24/1998 | D'Elena et al. | 707/4 |
| 5,819,261 | 10/06/1998 | Takahashi et al. | 707/3 |
| 5,794,233 | 8/11/1998 | Rubinstein | 707/4 |
| 5,787,416 | 7/28/1998 | Tabb et al. | 707/2 |
| 5,721,897 | 2/24/1998 | Rubinstein | 707/2 |
| 5,630,125 | 5/13/1997 | Zellweger | 395/600 |
| 5,630,117 | 5/13/1997 | Oren et al. | 395/602 |
| 5,619,708 | 4/8/1997 | Ho | 395/767 |
| 5,542,024 | 1/28/97 | Doner et al. | 707/5 |
| 5,542,024 | 7/30/1996 | Balint et al. | 395/161 |
| 5,375,235 | 12/20/1994 | Berry et al. | 395/600 |
| 5,167,011 | 11/24/1992 | Priest | 395/054 |
| 4,817,036 | 3/28/1989 | Millett et al. | 364/900 |

BACKGROUND OF THE INVENTION

Controlled vocabularies have been introduced to help end-users know which search words to use when they want to find information electronically. This minimizes the "hit or miss" frustration of open searches. A standard set of keywords are assigned to objects, and information providers make these keywords available to end-users through online catalogs or through hardcopy references. To help end-users devise a search strategy some of these controlled vocabularies organize keywords hierarchically using a set of codes assigned to each keyword.

Prior art in using a dictionary of keywords (Millett et al. U.S. Pat. No. 4,817,036) discloses the means to apply Boolean logic, "AND", "OR" and "NOT" conditions, on keywords to retrieve information. Priest (U.S. Pat. No. 5,167,011) discloses the means to present a controlled vocabulary graphically to enhance the user interface to functions on a computer. And Berry et al. (U.S. Pat. No. 5,375,235) organize keywords into a plurality of classes and locations within information objects to make a search more efficient. But none of these prior disclosures present a comprehensive way to integrate a controlled vocabulary in an end-user menu interface.

Zellweger has disclosed the means to create a content menu structure for an information system (U.S. Pat. No. 5,630,125) and for a database management system (Ser. No. 09/033,774). He has also disclosed the means for producing a menu structure that end-users navigate to generate a program code (Ser. No. 09/033,775). Oren et al. (U.S. Pat. No. 5,630,117) discloses the means to produce an interface that end-users navigate to retrieve objects. However, none of these prior disclosures involve managing information that is mediated by a controlled vocabulary that is hierarchically-oriented.

OBJECTS AND ADVANTAGES

It is a general object of the present invention to provide a method and apparatus for a graphical user interface that can be used by non expert end-users to locate information using hierarchical keywords.

One object of the present invention is to provide the means to enable end-users to navigate through successive list menus to locate information.

Another object of the present invention is to provide a graphical user interface means to display hierarchical keywords in a controlled vocabulary associated with a collection of information.

One object of the present invention is to provide a point-and-click interface to information arranged by hierarchical keywords.

Another object of the present invention is to provide an interactive menu means that can generate the Boolean logic in a database query command.

One object of the present invention is to provide a point-and-click interface for menu developers to assign keywords to information objects.

SUMMARY OF THE INVENTION

The objects of the present invention are attained by providing the methods and apparatus to produce a menu interface that enables non technical end-users to navigate through the hierarchy of keywords in a controlled vocabulary to select relevant keywords and generate a database query command.

DETAILED DESCRIPTION OF THE PREFERRED EMBODIMENT

Figure 1:
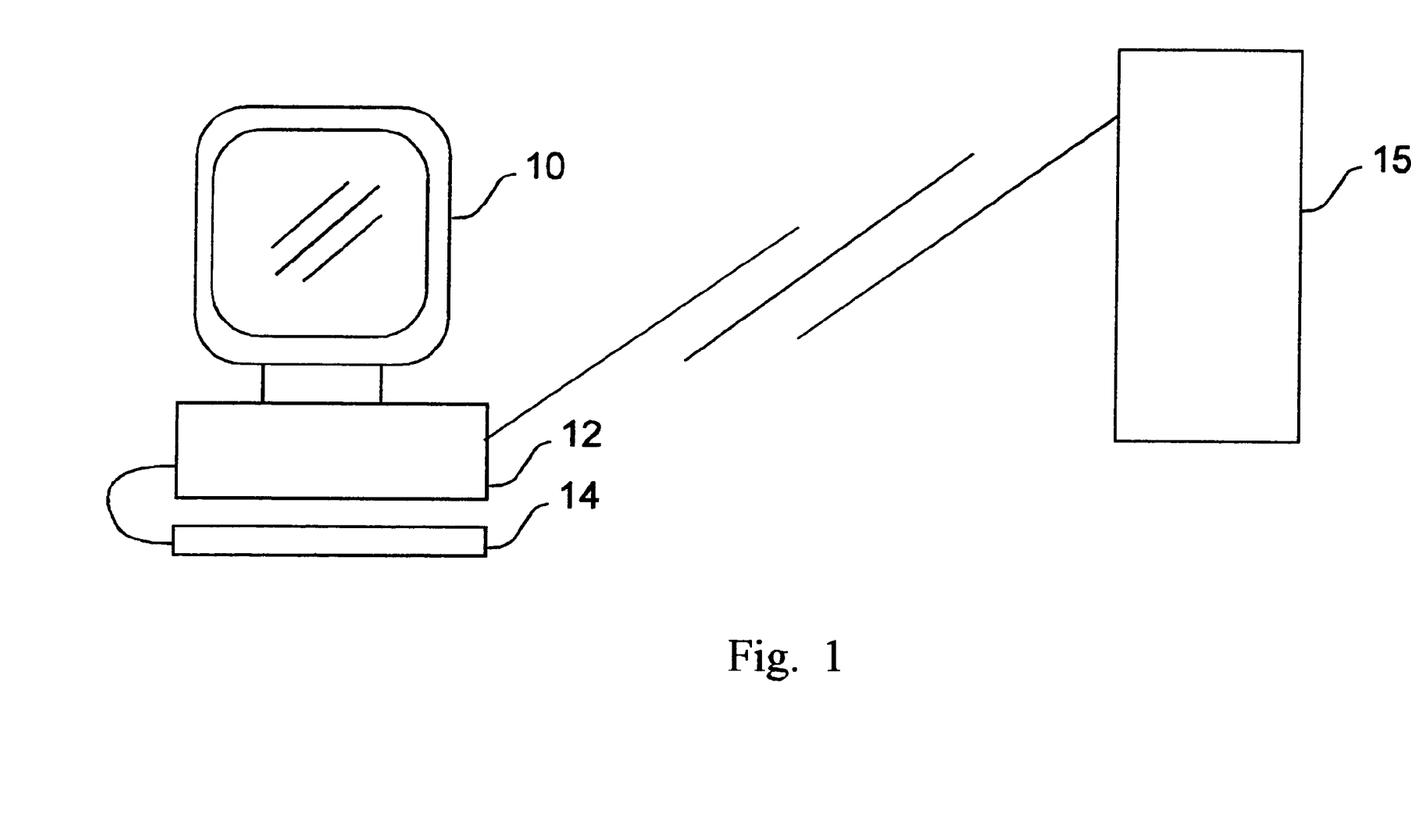
FIG. 1 depicts the computer system apparatus of the present invention.

The apparatus of the present invention, a computer monitor 10, keyboard input device 14, local computer 12, and remote computer 15, is displayed in FIG. 1. The computer monitor 10 displays the graphical user interface of the present invention. Input devices like the keyboard device 14 are connected to a local computer 12. Alternative input devices include voice recognition means, as well as other perceptual-motor and sensor-perceptual input means.

The local computer 12 is electronically linked to one or more computers, like remote computer 15, through network communications. Menu data from external sources of data include files on both the local computer 12 and remote computer 15.

The present invention discloses a menu access means that generates a query language command to retrieve information objects from a collection of objects that are identified by keywords. Each information object in the collection has been assigned one or more keywords from a set of predefined, hierarchically ordered keywords to help end-users differentiate one object from another.

The preferred embodiment of the present invention employs a relational database management system (RDBMS) to store and retrieve the information objects and the keywords associated with these objects. Media elements that make up the information objects are also managed by the RDBMS and are retrieved by addresses or data stored in its tables.

Alternative database architecture embodiments exist for the present invention and include the network or object oriented database architectures. In addition, alternative object storage embodiments include predefined file formats and file management systems that can store and manage a collection of information objects and their associated hierarchical keywords.

Figure 2A:
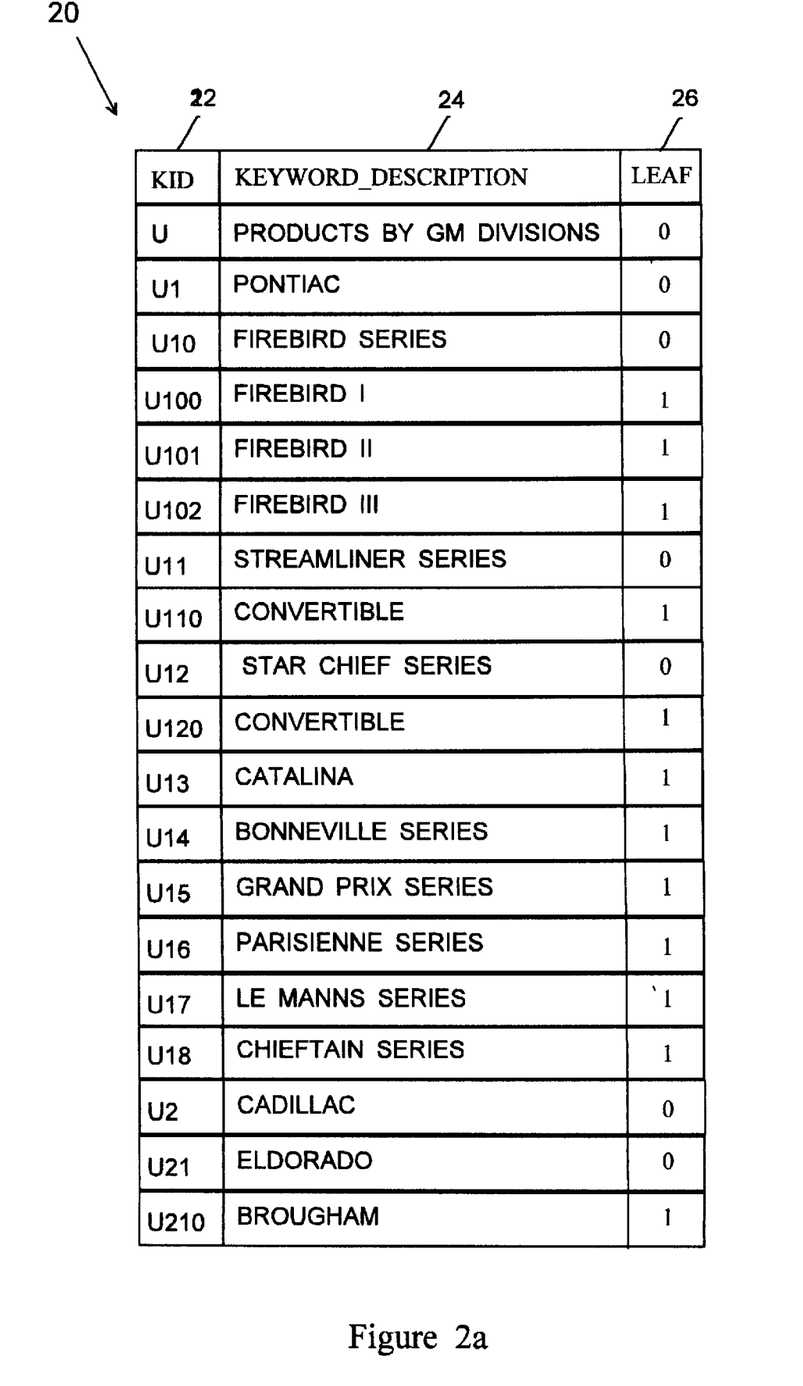
FIGS. 2a–2c depict sample hierarchical keywords and information objects used to demonstrate the present invention.
Figure 2B:
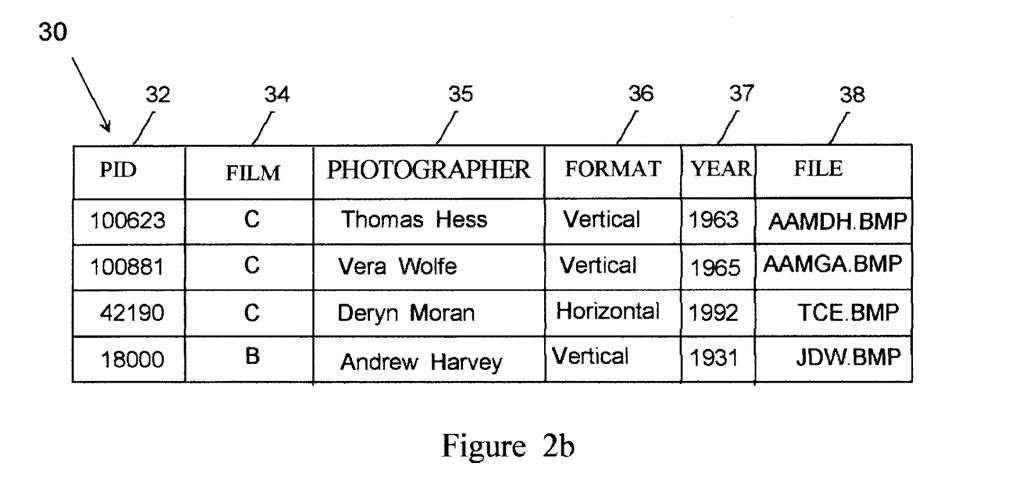
Figure 2C:
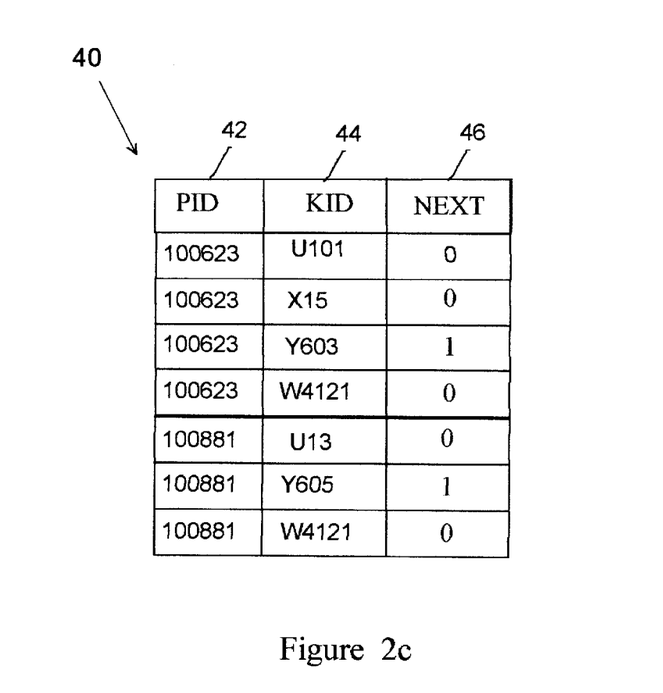

To demonstrate the present invention a database of photographs will be presented. FIGS. 2a through 2c depict the table structures used in the sample database. FIG. 2a depicts structure 20 that stores the dictionary of the controlled vocabulary. Its fields include the keyword description in column 24 and a keyword code stored in column 22. The keyword code, an alphanumeric character string, imposes a hierarchical ordering on the keywords. Each position in the code string represents a level in the hierarchy and each character is ordered by its alphanumeric value. The LEAF column 26 in structure 20 identifies keywords at the bottom of the hierarchical structure.

Information about each photograph is stored in table structure 30 depicted in FIG. 2b. Attributes about each photograph are stored in the structure's columns. These include a unique identification number for each picture in column 32, the type of film in column 34, the photographer in column 35, the film format in column 36, year the picture was taken in column 37, and in column 38 the file name that stores the graphic image.

And lastly, table 40 depicted in FIG. 2c is used to relate one or more keywords to a picture record in table structure 30. Column 42 in structure 40 stores the identification number for each picture record located in table 30. Column 44 stores the code for the keyword description in column 24 in structure 20 and column 46 indicates whether the code represents an end position in the keyword hierarchy.

Figure 3:
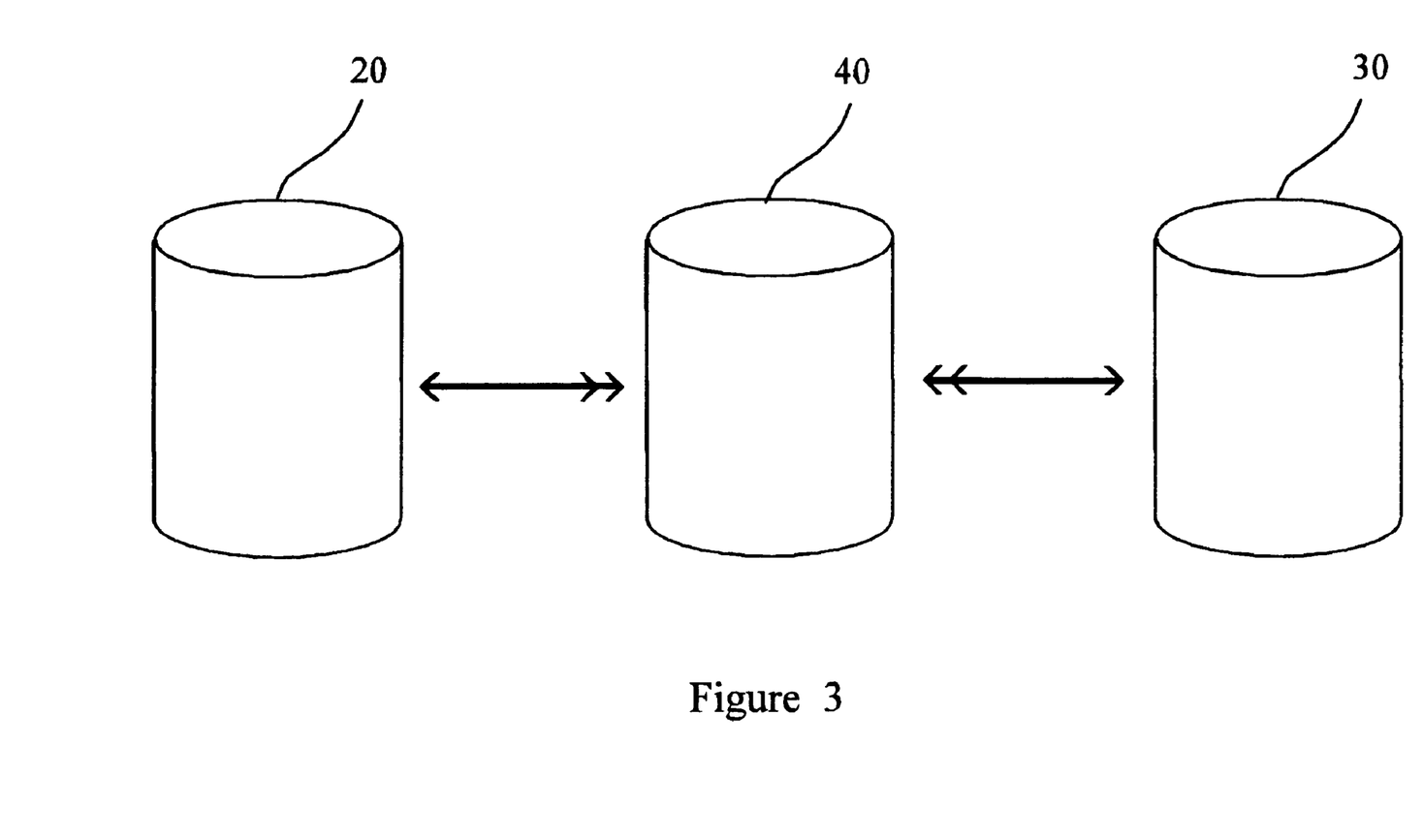
FIG. 3 depicts the relationship of the sample input databases.

FIG. 3 presents on overview of the database structures and depicts a graphic representation of the relationship of the records in structure 20, structure 30 and structure 40. Records in structure 30 have a one-to-many relationship to records in structure 40. That is, for each picture record in structure 30 there are one or more keyword code records in structure 40. Structure 20, the dictionary for the controlled vocabulary, functions as a lookup table for the full text description of each keyword. The keyword code in KID field 44 in structure 40 links to the KID field 22 in structure 20 to accomplish a lookup. Structure 20 has a one-to-many relationship to structure 40.

To access pictures in the database, the present invention discloses an integrated menu system which provides the means to navigate the keyword hierarchy and select one or more relevant keywords. FIGS. 4a through 4d depict the graphical user interface menus in this process.

Figure 4A:
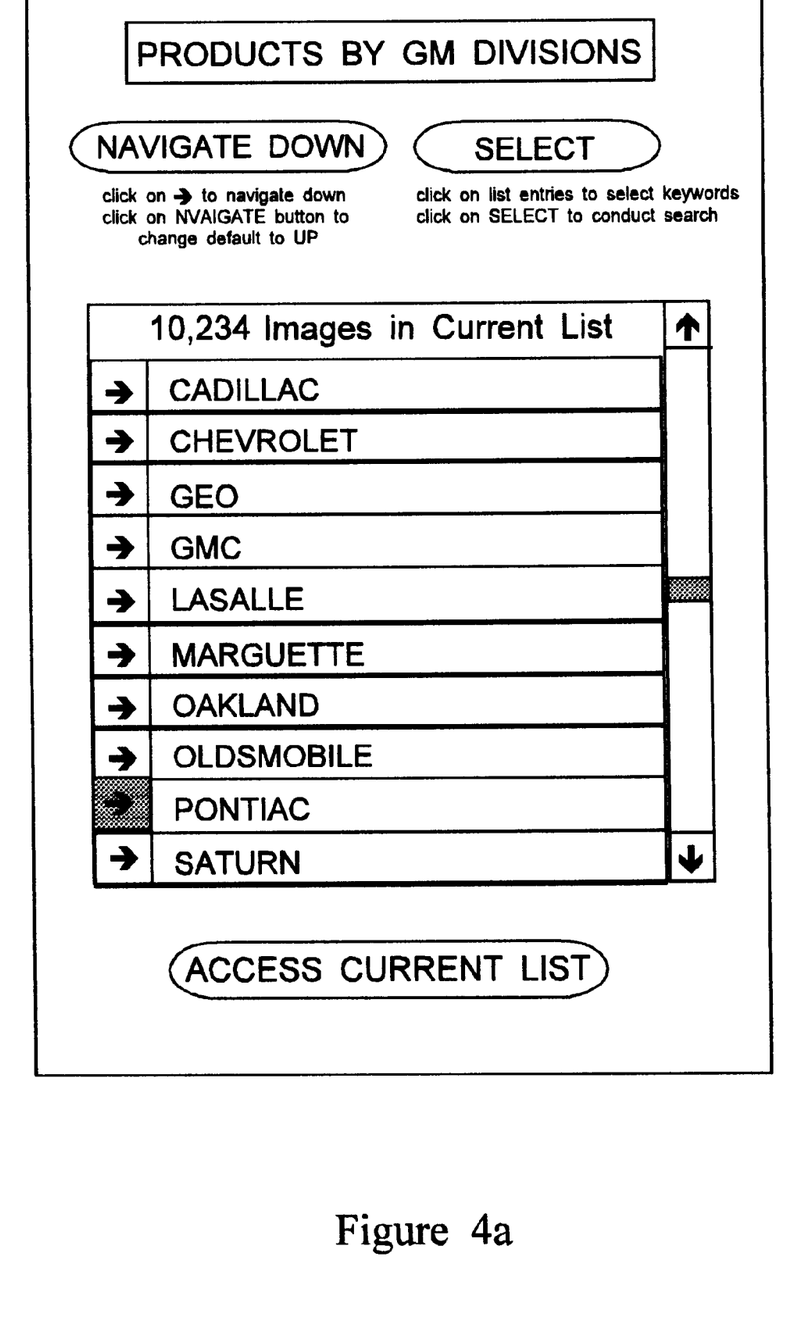
FIGS. 4a–4d depict the menus of the present invention.

FIG. 4a depicts a base menu frame that displays a list menu of keywords associated with pictures in the database. The base menu frame represents a starting point for the end-user to navigate through the list menus. The menu has four elements: a scrolling window of keywords, navigation icons, a Select button, a Navigate button, and an Access button.

The scrolling window displays a list of keywords that are associated with the current collection of objects. An end-user selects a keyword entry to identify a relevant topic. On selecting an keyword entry the background is darkened.

Figure 4B:
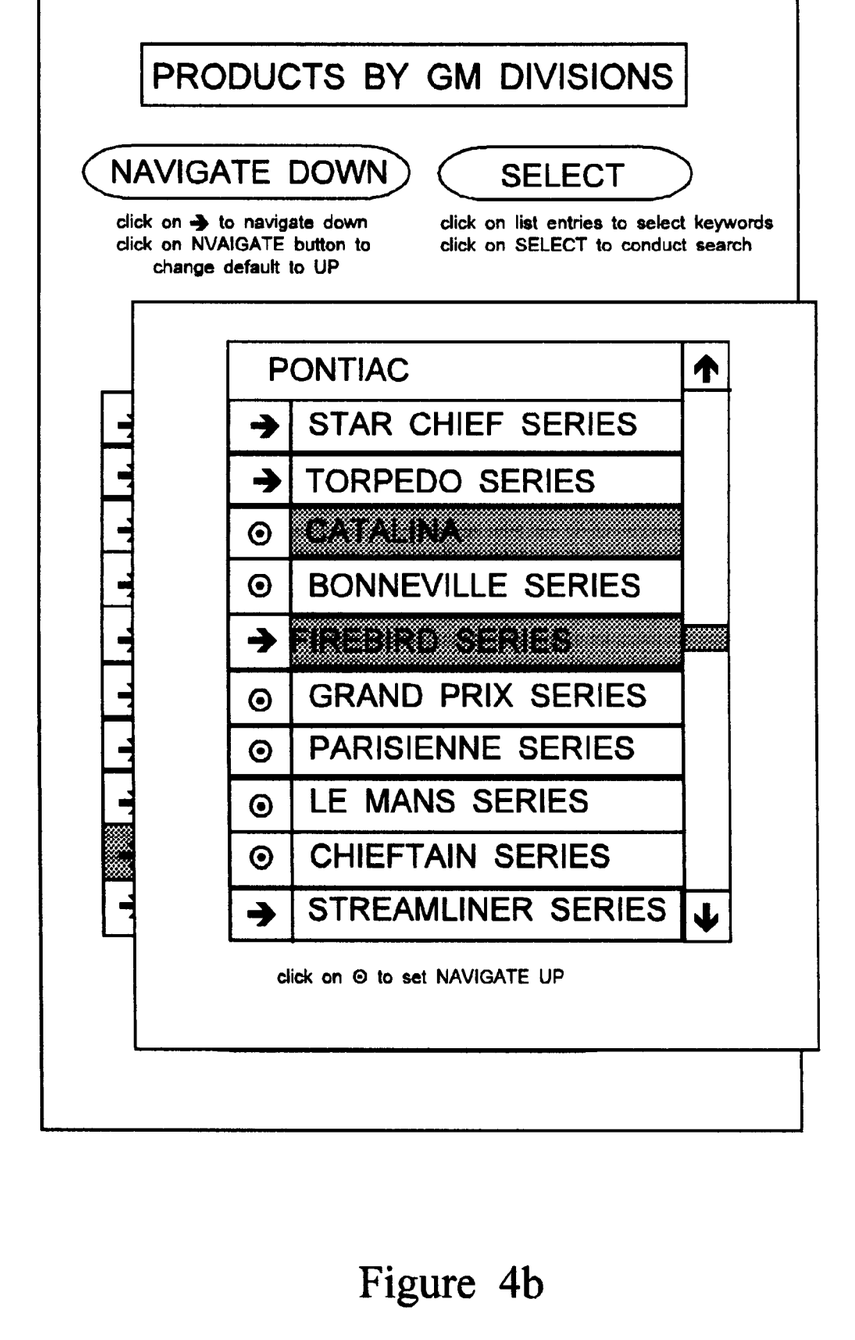

To move up or down the keyword hierarchy the end-user selects a navigation icon, a right or left arrow associated with a keyword entry. A right arrow represents movement down the structure and a left arrow represents upward movement. In FIG. 4a the background of the right arrow associated with the "Pontiac" entry is darkened to indicate a selection made by an end-user. When such a selection is made the present invention creates and displays the next level in a pop-up menu as depicted in FIG. 4b.

A concentric circle icon associated with a keyword entry indicates a keyword at the top or the bottom of the hierarchical ordering. The end-user selects a concentric icon to redirect the directional access. For instance, an end-user can click on a concentric icon associated with a keyword at the bottom of the structure to replace the icon with a left (or up) arrow.

The Navigate button on the base menu frame sets the default direction for the navigation icon. The end-user selects this button to toggle between up and down default states.

Figure 4C:
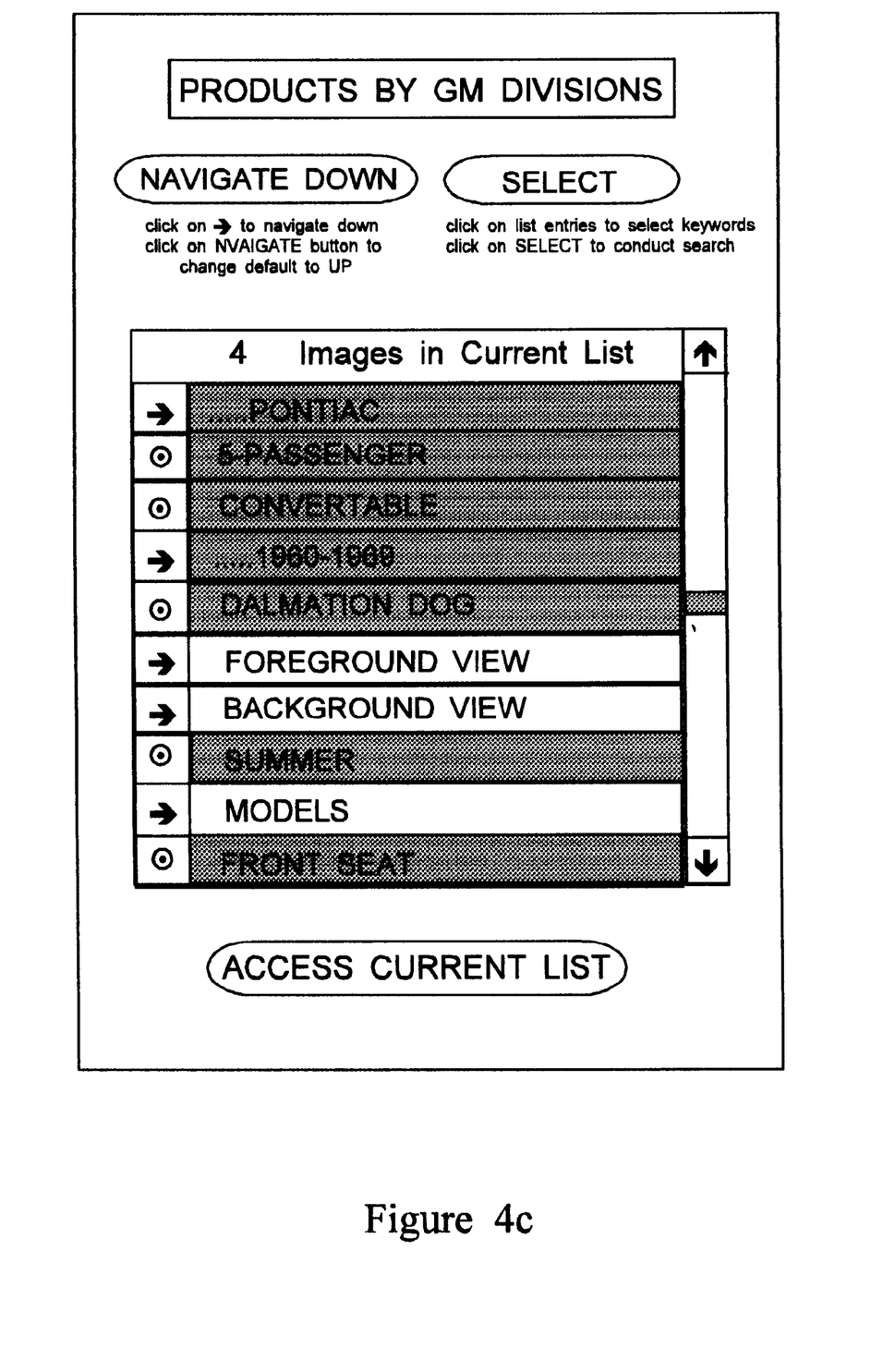

An end-user can select one or more keyword entries in a list window. When the end-user has finished selecting relevant keywords he or she clicks on the Selection button to reselect the objects in the current list. Each time this button is selected all pop-up windows are closed and the base frame menu is updated and re-drawn. FIG. 4c depicts a base menu frame after activating the Selection button when a number of keywords were selected.

Figure 4D:
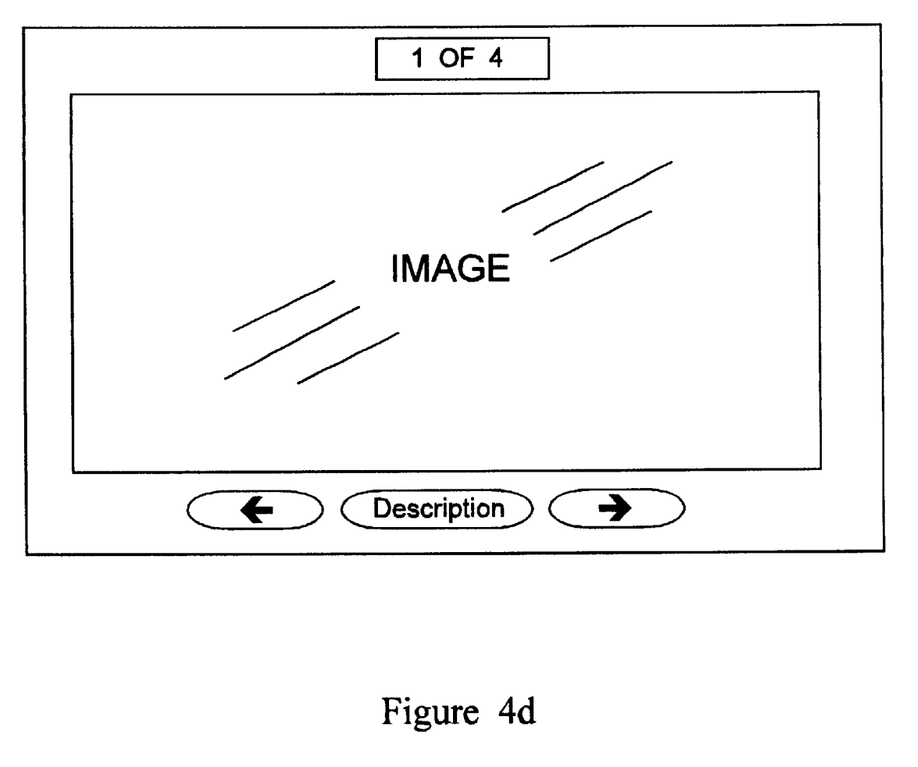

To view objects in the current list the end-user selects the Access button to display the list of objects in the object window displayed in FIG. 4d. In this window the end-user selects a left or right arrow button to move to the next or previous object in the list.

Figure 5:
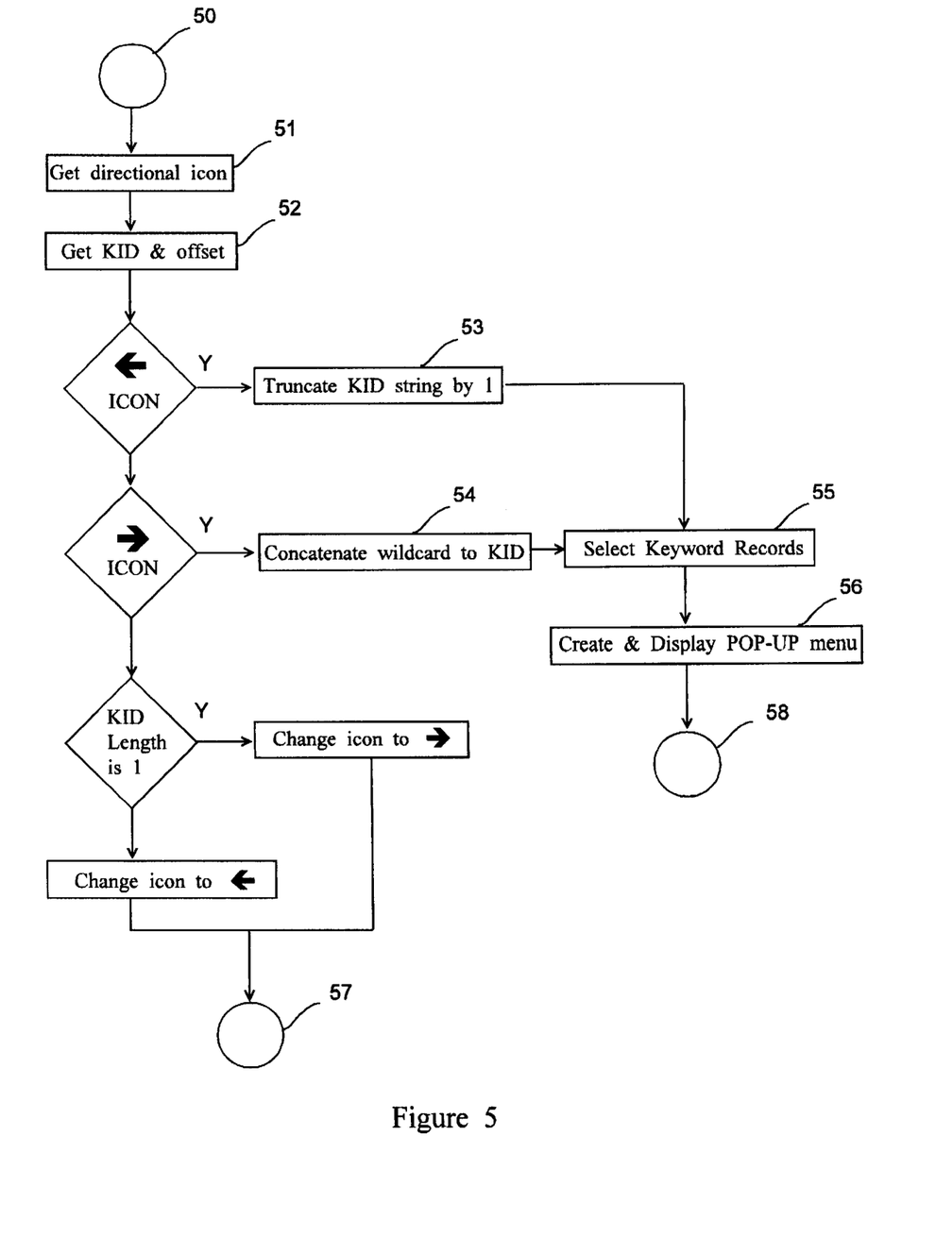
FIG. 5 depicts the flow chart of the software means in the present invention.

FIG. 5 depicts the flow chart of the event driven means to navigate up and down the keyword hierarchy. Whenever a navigation icon is selected, program control is activated at 50. At 51, the navigation icon selected by the end-user, a left or right arrow or a concentric circle, is retrieved from the current menu. At 52, the routine retrieves the associated keyword code string. If the navigation icon is not an arrow, routine 50 updates the navigation icon to a right or left arrow and returns control to the current menu at 57.

Otherwise, the end-user selects a navigation arrow to move up or down the keyword structure. To move up the structure and retrieve keywords associated at the parent level of the selected keyword, the last character in the keyword code string is dropped at 53. To retrieve keywords at the child level of the selected entry, a single wild card is added to the code string at 54. Next, the modified keyword code string is directly applied to a query statement at 55 that retrieves selected records from table 30 to create and display the next current pop-up menu at 56.

Figure 6:
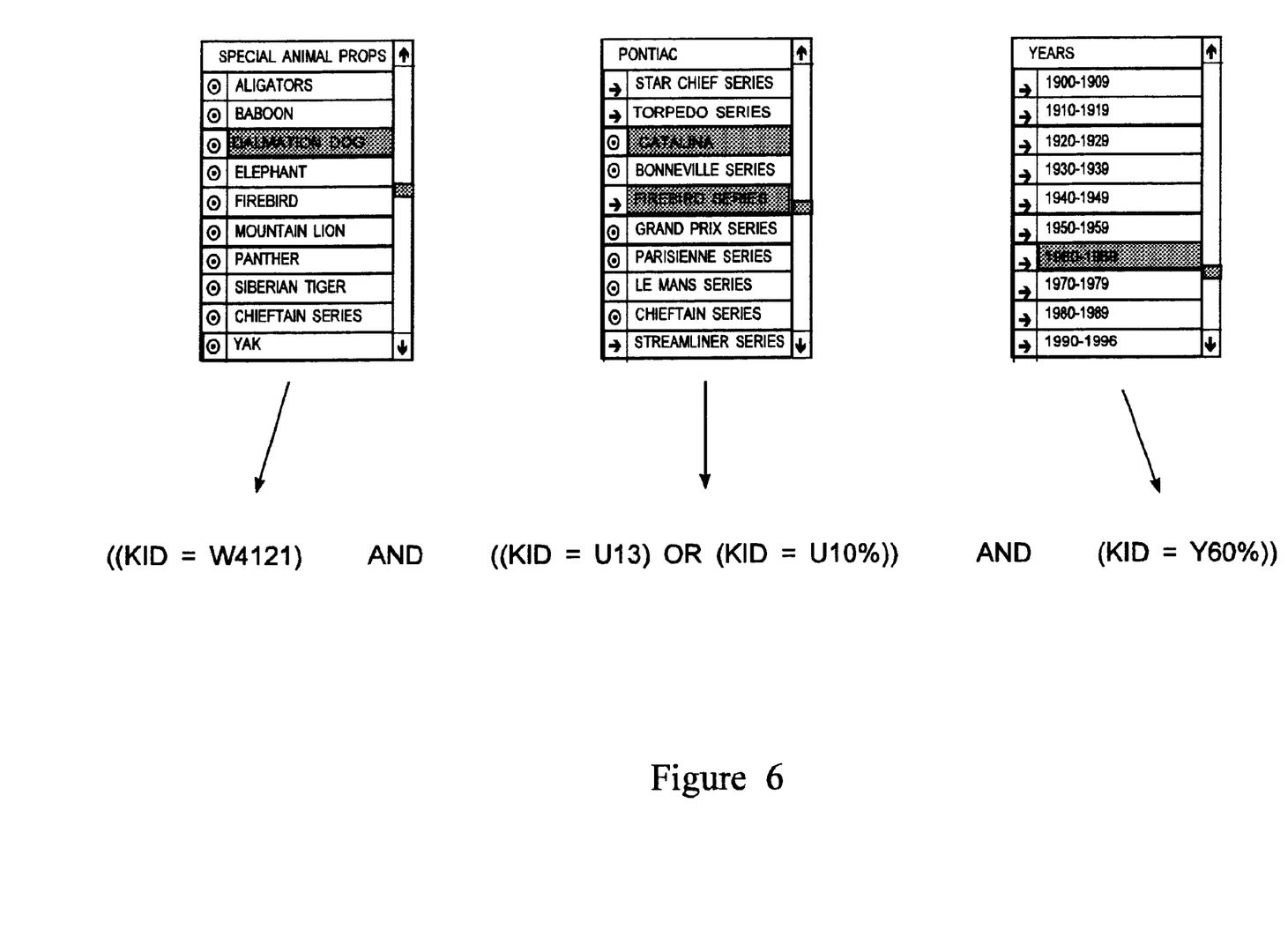
FIG. 6 depicts a graphic representation of the mapping between the menus in the present invention and the query language produced by the software means.

The relationship between keywords selected by the end-user and a Boolean expression generated by the present invention is depicted in the graphical representation in FIG. 6. In the preferred embodiment of the present invention the fist menu selections made by the end-used produces a Boolean expression that is consistent with the Structured Query Language (SQL) found in a relational database. Alternative embodiments of the present invention generate query statements that are consistent with the database query language and architecture.

The succession of selected entries across multiple list menus produces a Boolean expression. Multiple selections within the same list menu generate a series of embedded OR conditions, and multiple list menus that have selected entries generate a series of embedded AND conditions between each list.

The Boolean expression produced by the present invention is directly applied to the WHERE clause in an SQL Select statement. When a selected keyword entry represents a leaf in the structure an exact attribute-value condition is set. For example, "KID=U13". All other keywords generate a condition where the value contains an open wild card to retrieve all possible keyword descendants, "KID=Y60%".

Figure 7:
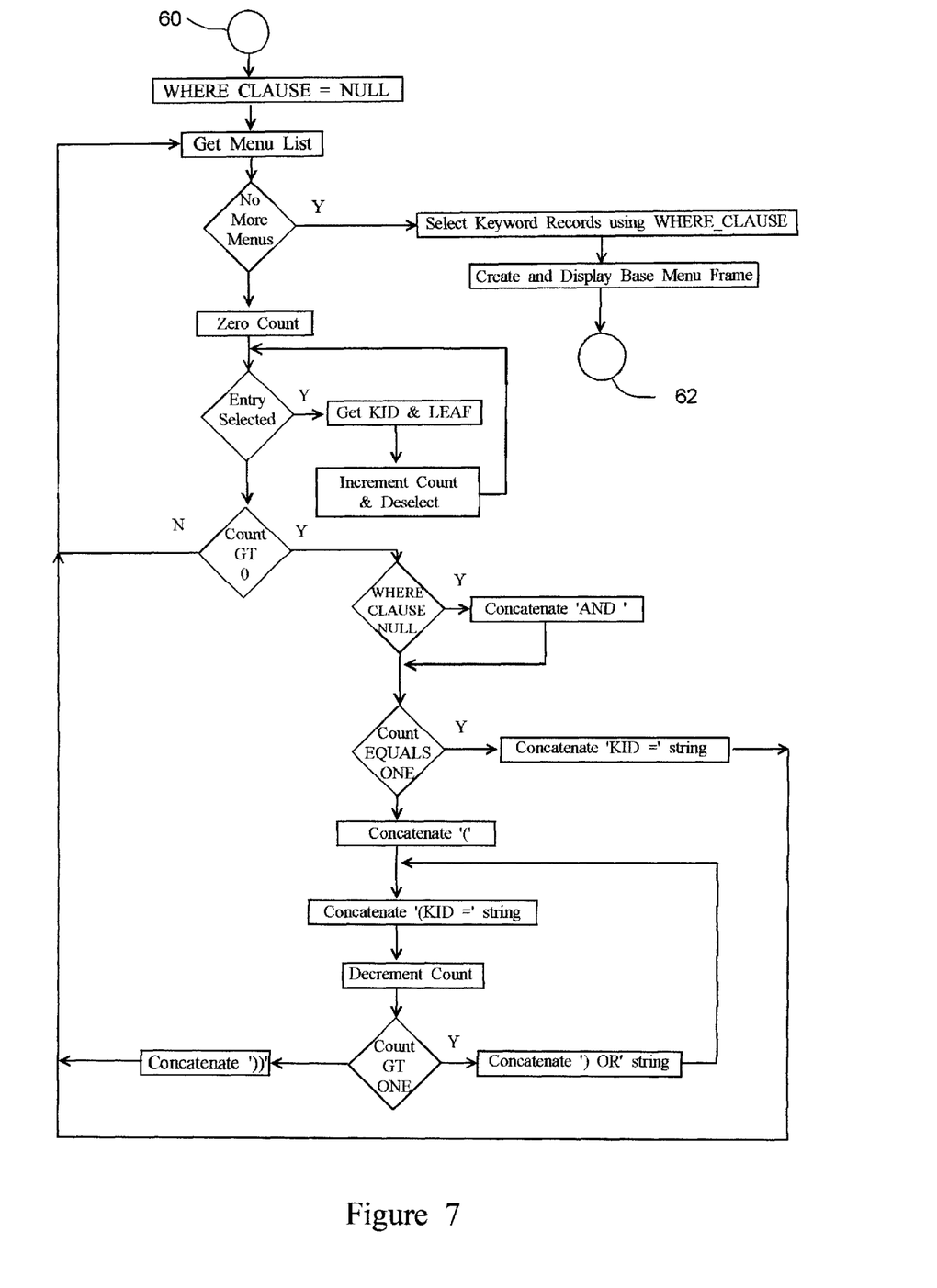
FIG. 7 depicts the flow chart of the software means in the present invention used to generate the query language.

FIG. 7 depicts the flow chart of the software means of the present invention that produces the base menu list menu. Each time the Select button on the base menu is selected program control is activated at 60. The routine reads through list menus selected by the end-user to generate a Boolean expression that it applies to a WHERE clause to select relevant keywords from structure 40 for the new base list menu.

Pointers managed by the event-driven environment are used by the routine to loop through the base menu and all associated pop-up menus. Each time a list menu has one or more selected menu entries, the routine maintains a count of the selected entries and produces a linked list in dynamic memory of the keyword code and the leaf flag value.

Next, if entries where selected on the list menu the procedure retrieves each keyword code and leaf flag data from the list and uses it to build the WHERE_CLAUSE. After all menu selections have been processed the procedure builds an SQL select statement using the WHERE_CLAUSE to select records from structure 40 to create and display the new updated base menu frame that becomes current after 62.

The preferred embodiment of the present invention employs a series of list menus to help the end-user select relevant keywords. When the end-user first calls the software menus of the present invention the base menu frame uses keyword records in structure 40. Keywords are displayed in each list menu and are drawn from records in table 40 that represent objects in a current collection. The present invention traces the upward path of these keywords, using the keyword lookup table 20, until a single term represents two or more terms located at lower levels of the structure.

An alternative embodiment of the graphical user interface employs a scrolling map of a graphical representation of the keyword hierarchy associated with objects in a current list. In this embodiment the end-user scrolls through the map and selects keywords at will and then clicks on the Select button to adjust the current list.

Figure 8:
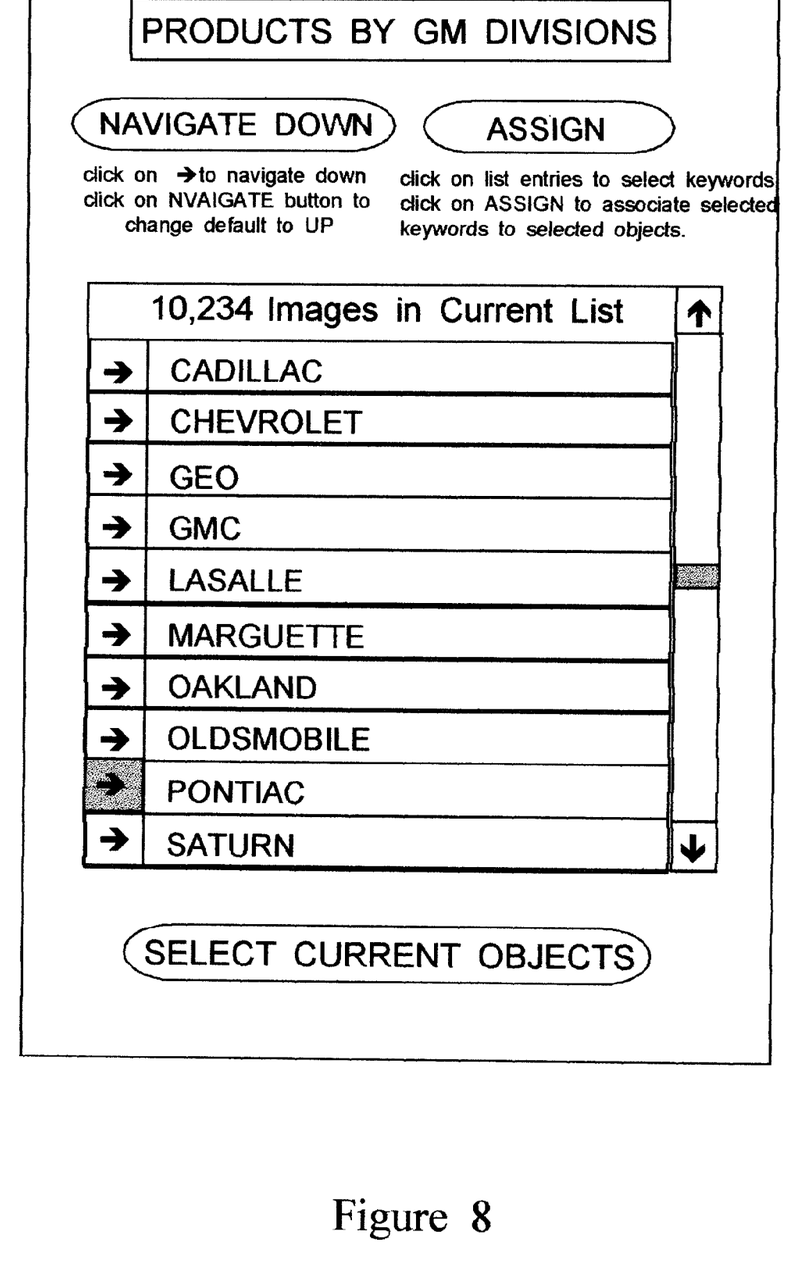
FIG. 8 depicts a graphic representation of the software menu in the present invention used by developers to assign keywords to information objects.

FIG. 8 depicts the software menu used by developers to assign keywords to information objects. The menu works like the base menu frame in FIG. 4a The developer navigates through the keyword dictionary in structure 20, using navigation icons described earlier, to select keywords to be assigned to information objects.

First, the developer clicks on the "Select Current Objects" button to select records in structure 30 that represent relevant information objects. After navigating through the hierarchical keyword structure and selecting specific entries, the developer selects the "Assign" button on the base menu frame to assign the selected keywords to the objects.

Figure 9:
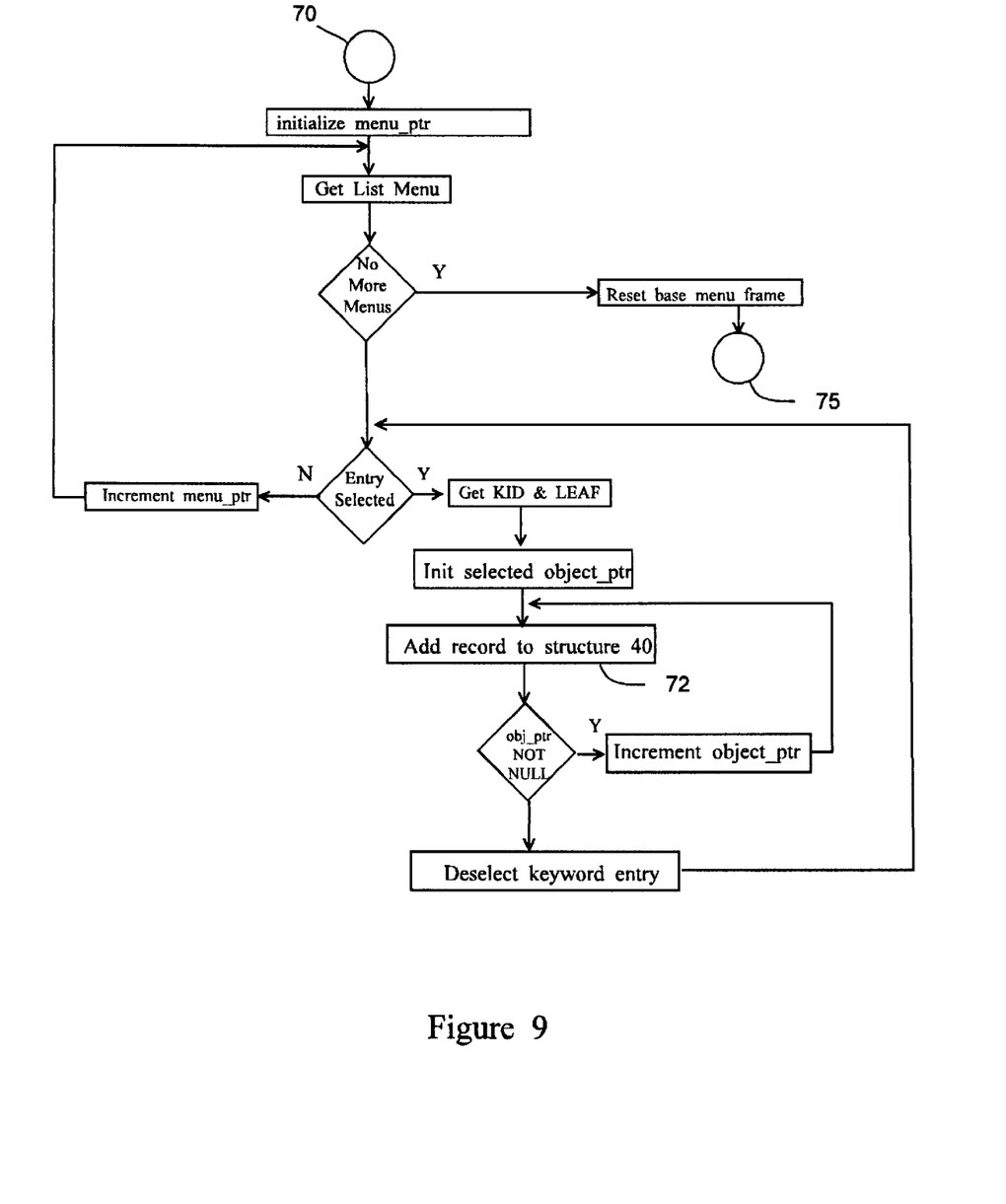
FIG. 9 depicts the flow chart of the software means in the present invention used to assign keywords to information objects.

The software means to assign keywords to information objects is represented by the flow chart in FIG. 9. When the "Assign" button on the developer's base menu is selected program control flows to the routine's entry point at 70. First the routine initializes a pointer to a list of the list menus. Next, it loops through each menu to identify selected entries. For each selected entry the routine fetches the KID and LEAF values from the menu and adds a record to structure 40 at 72 for each object selected using the object's PID value. At the end of the selected object list the routine loops back for the next selected keyword entry. At the end of menu list the routine resets the base menu frame and returns control to it at 75.

Conclusion

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. The scope of the present invention is not intended to be limited by this detailed description, but rather by the claims appended hereto.

Having described an embodiment of the invention we claim:

1. A computer software menu management system consisting of, storing a keyword in a controlled vocabulary and its predetermined code in a database that links each said keyword to a parent keyword at a parent level thereby creating a hierarchical organization that has a plurality of levels, selecting a set of keywords from said database that are linked to the same said parent keyword and are located at an identical level in said hierarchical organization, generating a list menu based on said set of keywords, adding a navigation control to said menu system, adding a search control to said menu system, displaying said list menu, fetching a selection made by an end-user associated with said navigation control, with said search control, and with said set of keywords in said list menu, generating another said list menu representing a parent and a child level in said hierarchical organization depending upon the type of navigation control selected by said end-user, fetching at least one said keyword selected by said end-user from said list menu selected when said search control is selected by said end-user, generating a database query that includes at least one said keyword selected by said end-user in said list menu when said search control is selected by said end-user.

2. The menu management system of claim 1 wherein said system is implemented in a computer program language that is compatible with at least one computer operating system.

3. The menu management system of claim 1 wherein said list menu is compatible with at least one computer operating system.

4. The menu management system of claim 1 wherein said database query is implemented in a database command language that is compatible with at least on database management system.

5. The predetermined code of claim 1 wherein said predetermined code system is compatible with at least one said controlled vocabulary.

6. The menu management system of claim 1 further includes a database query that include an OR condition.

7. The menu management system of claim 1 further includes a database query that include an AND condition.

8. The menu management system of claim 1 further includes a database query that includes a plurality of embedded expressions.

9. The menu management system of claim 1 further includes an assignment control employed by a content developer to assign said predetermined code to an information object.

10. A computer software menu management system consisting of, storing a keyword in a controlled vocabulary and its predetermined code in a database that links each said keyword to a parent keyword at the parent level thereby creating a hierarchical organization having a plurality of levels, selecting a set of keywords from said database that are all linked to the same said parent keyword and are located at an identical level in said hierarchical organization, generating a list menu based on said set of keywords, adding a navigation control to said menu system, adding a search control to said menu system, displaying said list menu, fetching a selection made by an end-user associated with said navigation control, with said search control, and with said set of keywords in said list menu, generating another said list menu representing a parent and a child level in said hierarchical organization depending upon the hype of navigation control selected by said end-user.

fetching at least one said keyword selected by said end-user from said list menu selected when said search control is selected by said end-user, generating a database query that includes at least one said keyword selected by said end-user in said list menu when said search control is selected by said end-user.

11. The menu management system of claim 10 wherein said system is implemented in a computer program language that is compatible with at least one computer operating system.

12. The menu management system of claim 10 wherein said list menu is compatible with at least one computer operating system.

13. The menu management system of claim 10 wherein said database query is implemented in a database command language that is compatible with at least on database management system.

14. The predetermined code of claim 10 wherein said predetermined code system is compatible with at least one said controlled vocabulary.

15. The menu management system of claim 10 further includes a database query that include an OR condition.

16. The menu management system of claim 10 further includes a database query that include an AND condition.

17. The menu management system of claim 10 further includes a database query that includes a plurality of embedded expressions.

* * * * *